United States Patent [19]

Merkel et al.

[11] Patent Number: 4,649,590
[45] Date of Patent: Mar. 17, 1987

[54] WINDSHIELD WIPER DEVICE

[75] Inventors: Wilfried Merkel, Kappelrodeck; Erich Kolb, Bühl, both of Fed. Rep. of Germany

[73] Assignee: Robert Bosch GmbH, Stuttgart, Fed. Rep. of Germany

[21] Appl. No.: 768,035

[22] Filed: Aug. 21, 1985

[30] Foreign Application Priority Data

Sep. 27, 1984 [DE] Fed. Rep. of Germany ....... 3435475

[51] Int. Cl.$^4$ .............................................. B60S 1/26
[52] U.S. Cl. .................................................. 15/250.21
[58] Field of Search ........... 15/250.13, 250.21, 250.23, 15/250.29, 250.3

[56] References Cited

U.S. PATENT DOCUMENTS 3,831,221 8/1974 Gmeiner et al. ................. 15/250.21
4,447,928 5/1984 Schüch et al. ................... 15/250.21

FOREIGN PATENT DOCUMENTS 2430831 1/1976 Fed. Rep. of Germany ... 15/250.23

Primary Examiner—Peter Feldman
Attorney, Agent, or Firm—Michael J. Striker

[57] ABSTRACT

In a windshield wiper, which includes a wiper arm carrying a wiper blade and driven by a wiper shaft to oscillate against a windshield pane being wiped, a lever mechanism is provided, which imparts to the wiper arm additionally a straight-line shifting movement in the direction of elongation of the wiper arm. The lever mechanism includes two four-joint guides, each of which includes two rocking levers positioned at two sides relative to the axis of the wiper arm, and a coupling rod which is connected by joints to each of the rocking levers and to the wiper arm.

4 Claims, 3 Drawing Figures

WINDSHIELD WIPER DEVICE

BACKGROUND OF THE INVENTION

The present invention relates to a windshield wiper device of the type including a wiper arm driven by a wiper shaft and carrying a wiper blade oscillating against the windshield of a motor vehicle.

Windshield wiper devices are known, in which a lever mechanism is formed as a four-joint-parallelogram. When such a mechanism is accommodated in a housing the latter must be sealed in the region of the extension of the wiper arm into this housing to prevent possible contamination of the joints and leakage of a lubricant. Such a sealing becomes problematic because the four-joint-parallelogram transmits the displacement motion and the oscillating motion to the wiper arm which can cause in the region of the penetration of the wiper arm into the housing a "striking movement" which can be avoided by the sealing which has, however, involved considerable expenses.

It has been also known that the shifting or displacing movement of the wiper arm must be controlled by a costly gear drive which should ensure a non-objectionable shifting movement.

SUMMARY OF THE INVENTION

It is an object of the present invention to provide an improved windshield wiper device.

It is another object of the invention to provide a windshield wiper device which would be less expensive than conventional wiper devices of the foregoing type.

These and other objects of the invention are attained by a windshield wiper device for motor vehicles, comprising an elongated wiper arm driven to perform an oscillating motion and carrying at a free end thereof a wiper blade lying against the windshield to be wiped; a housing structure receiving an end of said wiper arm opposite to said free end; a wiper shaft rigidly connected to said housing structure and driving said wiper arm to impart thereto said oscillating motion; and a lever mechanism connected to said wiper arm to impart thereto a displacement motion superposing said oscillating motion and extended at least approximately in the direction of elongation of said wiper arm, said lever mechanism being supported on said housing structure and comprising two four-joint guides each including two rocking levers positioned at two opposite sides relative to an axis of elongation of said wiper arm and each having one end supported in said housing structure and the other end, a coupling rod hingedly connected at both ends thereof to the other ends of said two rocking levers, the coupling rod of each four-joint guide being hingedly connected to said wiper arm.

The invention offers a great number of various possibilities for a control and a cycle of the displacement or shifting motion of the wiper arm so that the wiper blade can be optimally adjusted to the fields to be wiped for all shapes of the windshield panes.

A hinge connection of each coupling rod to said wiper arm may be provided in the middle of each coupling rod between a hinge connection of one of said rocking levers with the coupling rod and a hinge connection of the other of said rocking levers with the coupling rod in each four-joint guide.

The coupling rods of two four-joint guides may be hingedly connected to each other at a joint and other of said rocking levers may be mutual for both two four-joint guides and be hingedly supported in said joint.

The device may further include a crank connected to said wiper shaft and rotationally supported in said housing structure, and a connecting rod having one end hingedly connected to said crank and another end hingedly connected to said wiper arm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
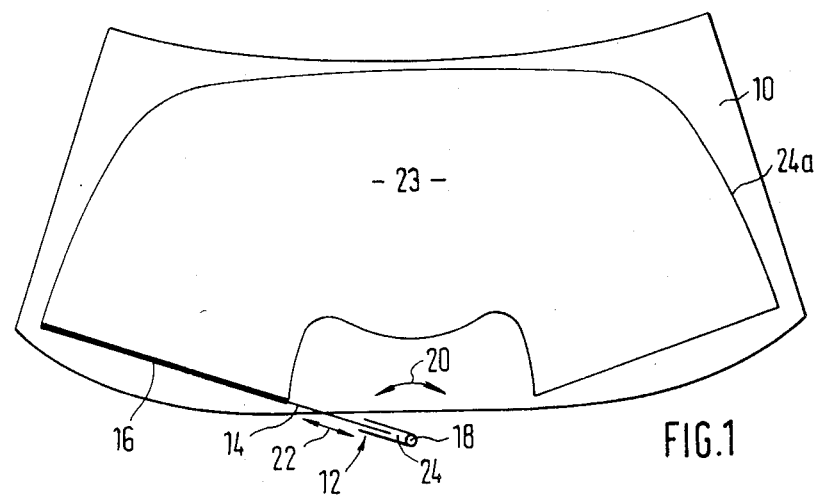
FIG. 1 is a front view of the windshield of a motor vehicle with a wiper device of the invention, wherein a wiper blade performs an oscillating movement and is also displaced in the direction of its elongation.

Referring now to the drawings in detail, and firstly to FIG. 1 thereof, it will be seen that a windshield pane 10 of a vehicle has a wiper device 12 which includes a wiper arm 14 driven to oscillate between two end positions in the known fashion. A wiper blade 16 is rigidly connected to wiper arm 14 to oscillate therewith against the windshield pane 10. Oscillating motion of the wiper arm 14 is performed in the directions shown by a double arrow 20. During such oscillating motion the wiper arm 14 is displaced back and forth on pane 10 in the direction of the elongation of the arm, as shown by a double arrow 22 so that the blade covers a field 23 to be wiped, which field is limited by a line 24a. Due to the displacement of the wiper arm and wiper blade in the directions 22 the size and the position of field 23 can be adjusted as required. This is particularly necessary when the wiper device of the windshield is provided only with one individual wiper lever 14, 16.

As can be further seen from FIG. 1 the wiper arm 14 is guided on a support or housing structure 24 which is rigidly connected to a wiper shaft 18 and has a narrowed guiding portion 25. The support structure 24 is formed as a housing which supports thereon a lever mechanism 26. Two rocking levers 28 and 30 are supported on one wall of the structure 24 at a distance from each other so that they can oscillate; bearing supports of the rocking levers 28 and 30 on the structure 24 are denoted by reference numerals 32 and 34, respectively. At the ends of the rocking levers 28 and 30, facing away from the bearing supports 32 and 34, the ends of coupling rods 40 and 42 are hinged at the respective hinges 36 and 38. The opposite ends of the coupling rods 40 and 42 are connected to each other at a joint 44. A rocking lever 46 is in turn connected to the joint 44. Rocking lever 46 is connected to the housing or support structure 24 at a bearing or hinge support 48.

Figure 2:
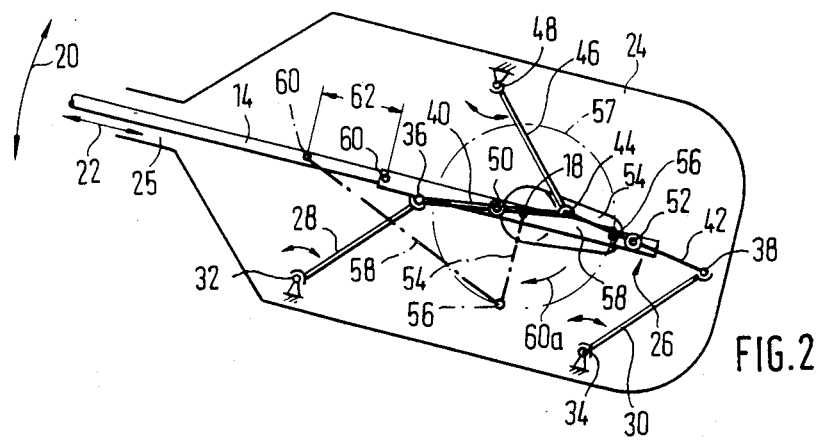
FIG. 2 is a schematic view of the first embodiment of a lever mechanism which effects the displacement of the wiper blade.

As seen in FIG. 2, hinges 32, 34 of rocking levers 28, 30 and hinge 48 of the rocking lever 46 are arranged at the opposite sides of the axis of elongation of the wiper arm 14. Both coupling rods are connected to the wiper arm 14 at joints 50 and 52, respectively. Joints 50, 52 are each positioned exactly in the middle between the joint 36 and joint 44, and between joint 38 and joint 44, respectively. The lever mechanism 26 thus has two four-joint guides or linkages for tracing a straight line. The first straight-line linkage is formed by the locking lever 28, coupling rod 40 and rocking lever 46 wherein four joints are joints 32, 36, 44 and 48. The second straight-line linkage is formed by the rocking lever 30, coupling rod 42 and also rocking lever 46. The joints of the second four-joint straight-line linkage are joints 34, 38, 44 and 48. It is understood that joints 44 and 48 belong to the both four-joint straight-line guides or linkages.

As further shown in FIG. 2, a crank 54 is pivotally or oscillatingly supported in the housing or support structure 24. A crank or pivot pin 56 is provided at one free end of crank 54. A thrust or connecting rod 58 is also pivotally connected to the crank pin 56. The other end of the rod 58 is connected to the wiper arm 14 at a point 60. In order to better present a mode of operation of the so-formed crank drive or mechanism the crank 54 and the thrust or connecting rod 58 are shown by dash-dotted lines in one position which takes place when the crank 54 is pivoted by a pivot angle of approximately 90° in the direction of arrow 60a. In this operational position, the wiper arm 14 is displaced by such amount which is identified by a distance 62. The distance 62 corresponds to a half of a maximal displacement of the wiper arm 14 in the direction of elongation thereof indicated by arrow 22.

Figure 3:
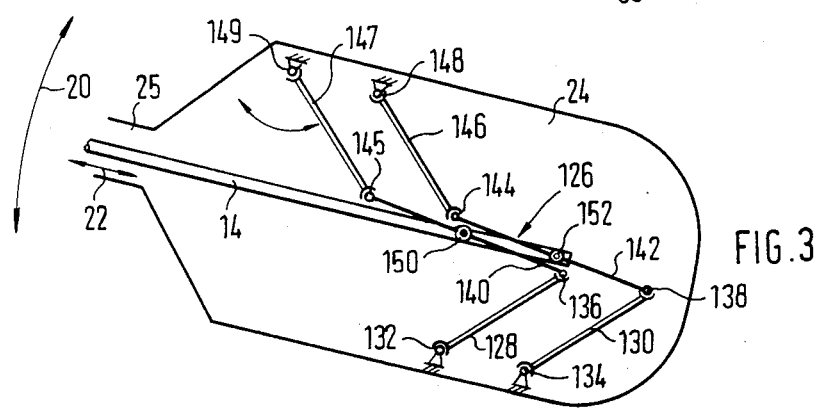
FIG. 3 is a schematic view of the second embodiment of the lever mechanism.

In the embodiment of FIG. 3 the housing structure 24 and the construction of the wiper arm 14 correspond to those of the embodiment of FIG. 2. Two four-joint straight-line guides or slides are also provided in this embodiment, of which the first four-joint straight line guide is formed by a first rocking lever 128, coupling rod 140 and a second rocking lever 147 and has four joints 132, 136, 145 and 149 whereas the second four-joint straight-line guide includes a rocking lever 130, a coupling rod 142 and a coupling rod 146 and has four joints 134, 138, 144 and 148. The first four-joint straight-line guide is connected to the wiper arm 14 via a joint 150 whereas the second straight line guide is coupled to the wiper arm 14 via a joint 152.

The embodiment according to FIG. 3 is, as compared to the structure of FIG. 2, more robust, simpler and less expensive. For driving the lever mechanism of FIG. 3 a crank drive, utilized in the embodiment of FIG. 2, can be also employed. For the sake of clarity the illustration of such a drive in FIG. 3 is omitted. It is, of course, understandable that any other suitable and conventional drives, for example gear drives or transmissions, can be employed for driving the lever mechanism according to the invention.

The mode of operation of, the wiper device shown in FIGS. 1 and 2 is as follows:

The wiper blade 16 is shown in one operational position which is relatively close to the wiper shaft 18. Accordingly, in the illustrated operational position the wiper arm 14 is drawn into the housing structure 24 by a maximal distance. When now the wiper blade 16 is pivoted in the clockwise direction relative to the wiper shaft 18 the crank 54 also pivots or rotates in the direction of arrow 60a independently from the housing structure 24. After crank 54, pivoted by 90°, has reached its operational position, shown by the dash-dotted line, the wiper arm 14 in this position is displaced in the direction away from the housing structure 24 by the distance 62. With the advanced oscillating motion of the wiper arm 14, crank 54 rotates further up to 180° unless it reaches another operational position in which the wiper arm is maximally drawn away from the housing structure 24. This another operational position takes place when the wiper blade 16 points to the left-hand upper corner of the windshield pane 10. During a further pivoting of the wiper blade in the clockwise direction the wiper arm 14 is drawn again into the housing or guide structure 24 unless crank 54 covers a pivot angle 360°. In this operational position the wiper blade covers a half of its entire pivot or oscillation angle. In a further course of the wiping stroke, the motion path of the crank drive 54 is repeated and the wiper arm 14 is moved in the direction of elongation thereof in the above described fashion whereby a normal maximal displacement of the wiper arm away from the housing structure 24 is obtained when the wiper blade 16 reaches the position at the right-hand upper corner of the windshield pane 10.

During the pivoting motion of the wiper blade 16 in the backward direction towards its initial position, shown in FIG. 1, the displacement of the wiper arm 14 is respectively repeated. Since the crank 54 performs its movement independently from the housing structure 24 the given pivot angle is always associated with a respective operational position of the housing structure 24. The absolute actual amount of movement of the crank 54 is, however, always greater than the respective swinging angle covered by the housing structure 24. It should be further noted that the path of movement of the crank pin 56 is designated in FIG. 2 by a circle 57.

As mentioned above the displacement of the wiper arm 14 in the direction of elongation is effected by the crank drive 54, 58. The guidance of the wiper arm itself is, however obtained because the wiper arm is connected to the four-joint straight line-guides at the joints 50, 52 or 150, 152. Thereby at least approximately a straight-line displacement of the joints 50, 52 or 150, 152 in the direction of elongation of the wiper arm 14 is obtained so that a sealing of the housing structure 24 in the region of the housing guiding portion or opening 25, at which the wiper arm 14 extends into the housing structure 24, presents no problems.

It will be understood that each of the elements described above, or two or more together, may also find a useful application in other types of windshield wipers differing from the types described above.

While the invention has been illustrated and described as embodied in a windshield wiper device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper device for motor vehicles, comprising an elongated wiper arm driven to perform an oscillating motion and carrying at a free end thereof a wiper blade lying against the windshield to be wiped; a housing structure receiving an end of said wiper arm opposite to said free end; a wiper shaft rigidly connected to said housing structure and driving said wiper arm to impart thereto said oscillating motion; and a lever mechanism connected to said wiper arm to impart thereto a displacement motion superposing said oscillating motion and extended at least approximately in the direction of elongation of said wiper arm, said lever mechanism being supported on said housing structure and comprising two four-joint guides each including two rocking levers positioned at two opposite sides relative to an axis of elongation of said wiper arm and each having one end supported in said housing structure and the other end, a coupling rod hingedly connected at both ends thereof to the other ends of said two rocking levers, the coupling rod of each four-joint guide being hingedly connected to said wiper arm.

2. The device as defined in claim 1, wherein a hinge connection of each coupling rod to said wiper arm is provided in the middle of each coupling rod between a hinge connection of one of said rocking levers with the coupling rod and a hinge connection of the other of said rocking levers with the coupling rod in each four-joint guides.

3. The device as defined in claim 2, wherein the coupling rods of two four-joint guides are hingedly connected to each other at a joint, and wherein the other of said rocking levers is mutual for both two four-joint guides and is hingedly supported in said joint.

4. The device as defined in claim 3, further including a crank connected to said wiper shaft and rotationally supported in said housing structure, and a connecting rod having one end hingedly connected to said crank and another end hingedly connected to said wiper arm.

* * * * *